(12) United States Patent
Metzger

(10) Patent No.: US 6,418,409 B1
(45) Date of Patent: Jul. 9, 2002

(54) ERROR DERIVED SCORES FOR DETECTION SYSTEMS

(75) Inventor: Yaakov Metzger, Givataim (IL)

(73) Assignee: Persay Inc., Wilmington, DE (US)

( * ) Notice: Subject to any disclaimer, the term of this patent is extended or adjusted under 35 U.S.C. 154(b) by 0 days.

(21) Appl. No.: 09/427,098

(22) Filed: Oct. 26, 1999

(51) Int. Cl.$^7$ .............................................. G10L 15/08
(52) U.S. Cl. ...................................... 704/240; 704/236
(58) Field of Search ................................. 704/200, 251, 704/255, 256, 239, 240, 241, 231, 236

(56) References Cited

U.S. PATENT DOCUMENTS

| | | | |
|---|---|---|---|
| 4,489,434 A | * 12/1984 | Moshier ..................... | 704/251 |
| 5,182,773 A | * 1/1993 | Bahl et al. ................... | 704/222 |
| 5,727,081 A | * 3/1998 | Burges et al. .............. | 382/229 |
| 5,926,555 A | 7/1999 | Ort et al. | |
| 5,978,495 A | * 11/1999 | Thomopoulos et al. ..... | 382/184 |

OTHER PUBLICATIONS

R.O. Duda and P.E. Hart, *Pattern Classification and Scene Analysis*, Wiley, 1973, pp. 10–13.

A. Rosenberg and F.K. Soong, "Recent Research in Automatic Speaker Recognition", *Advances in Speech Signal Processing*, 1991.

Douglas A. Reynolds, "Comparison of Background Normalization Methods for Text–Independent Speaker Verification", *Proceedings of Eurospeech '97*, Rhodes, Greece, pp. 963–966.

H. Gish and M. Schmidt, "Text Independent Speaker Identification", *IEEE Signal Processing Magazine*, Oct. 1994.

Douglas A. Reynolds, "Speaker Identification and Verification using Gaussian Mixture Speaker Models", *Speech Communication*, vol. 17, Aug. 1995, pp. 91–108.

S. Furui, "An Overview of Speaker Recognition Technology", *Proceedings of the ESCA Workshop on Automatic Speaker Recognition, Identification and Verification*, Martigny, 1994.

G.R. Doddington, "Speaker Recognition—Identifying People by their Voices", *Proceedings of the IEEE 73*, No. 11, 1985.

L.R. Rabiner and S.W. Schafer, *Digital Processing of Speech Signals*, Prentice Hall, 1978, chap. 8, pp. 396–461.

* cited by examiner

*Primary Examiner*—Richemond Dorvil
(74) *Attorney, Agent, or Firm*—Eitan, Pearl, Latzer & Cohen-Zedek

(57) ABSTRACT

A method for use in a detection unit that produces a score to be converted into a binary decision via the setting of a threshold is a method for generating the score as an error-derived score such that the threshold is a tolerable one-sided error probability. The method includes the steps of generating a primary score that is a monotonic function of the posterior probability, obtaining a distribution of primary scores of input signals that ought to lead to a particular binary decision, and translating, based on the distribution, the primary score of a current input signal to the error-derived score.

9 Claims, 4 Drawing Sheets

ERROR DERIVED SCORES FOR DETECTION SYSTEMS

FIELD OF THE INVENTION

The present invention relates to scoring of detection systems, in general, and to error-derived scoring of detection systems, in particular.

BACKGROUND OF THE INVENTION

A detection system is a system that receives an input signal and has to detect a property of the signal, typically whether the source of the signal is a predefined object. Such systems may include radar systems, speaker recognition systems, medical diagnostic systems, fingerprint identification systems and many more. In speaker recognition systems, for example, the input signal is a collection of speech samples, and the property to be detected is the identity of the speaker. See, for example, A. Rosenberg and F. K. Soong, "Recent Research in Automatic Speaker Recognition", *Advances in Speech Signal Processing*, S. Furui and M. M. Sondhi, Eds., Marcel Dekker Inc., 1991 and U.S. Pat. No. 5,926,555 to Ort et al.

Reference is made to FIG. 1, which is a block diagram illustration of a detection system, generally referenced 100, as is known in the art. Detection system 100 comprises a detection unit (DU) 102 and an application system (AS) 104. AS 104 issues a detection command to DU 102 with the necessary parameters. AS 104 must supply DU 102 with one or more claimed identities of the target. DU 102 collects the input signal, transforms it to some internal representation and compares the internal representation with the claimed identities. The detection result is sent to AS 104, which performs a predefined action according to this result. In speaker recognition systems, for example, the action can be to grant the speaker access to some service, or to reject the speaker as an impostor.

In many detection systems, the detection result of DU 102 is not a binary positive/negative decision, but rather a numerical score. This score indicates the certainty of the suggested decision. A commonly used score is the posterior probability that defines the probability of detecting the searched property given the input signal, as is described in R. O. Duda and P. E. Hart, *Pattern Classification and Scene Analysis*, Wiley, 1973, pp. 10–13. In speaker recognition systems, for example, this score can be the probability that the given speech samples were generated by the claimed identity speaker.

When AS 104 has to choose an action based on the detection result, the numerical score is translated into a binary positive/negative decision. This is done by setting a threshold, so that the decision made (and the action performed) depend upon whether the score is above or below the threshold.

The threshold is set after considering many factors, such as the prior probabilities of having each result (the probabilities are known to AS 104 in advance), and the cost of the different possible errors. Two general types of errors are possible. A "false positive" error happens when a positive decision is made by AS 104 while the correct decision (by some criterion other than a comparison with the threshold) is negative. A "false negative" error happens when a negative decision is made by AS 104 while the correct decision (by some criterion other than a comparison with the threshold) is positive.

For example, an application subsystem of a speaker recognition system in a bank may decide to grant access to some data only to speakers who scored more than 0.99. The threshold is set so high because it is known that the cost of showing the data to an impostor is very high, but the cost of rejecting a true speaker is not that high because he can try again. To demonstrate the influence of prior probability on the setting of the threshold, this threshold may be increased at nighttime to 0.995 reflecting the prior knowledge that most breaking in events happen at night.

Reference is now made to FIG. 2, which is an illustration of a graph showing the count of scores as a function of the score value, for a hypothetical detection system, as is known in the art. A threshold 200 divides the scores into positive scores 201 (scores higher than the threshold 200 lead to a positive decision by an application system) and negative scores 202 (scores lower than the threshold 200 lead to a negative decision by the application system). A distribution 203 of scores for which the correct decision is positive, is indicated with a dashed-line curve. Similarly, a distribution 204 of scores for which the correct decision is negative, is indicated with a solid-line curve.

A hatched area 205 indicates the rate of false negative errors, i.e. scores for which the correct decision is positive and which lead to a negative decision by the application system. A hatched area 206 indicates the rate of false positive errors, i.e. scores for which the correct decision is negative and which lead to a positive decision by the application system.

Choosing the threshold 200 inaccurately may result in sub-optimal use of the detection system. If the threshold is too low, there may be too many false positive errors. The reduction of false negative errors in this case does not necessarily compensate for the increase of the false positive errors. Rather, the relative significance of false positive errors and false negative errors is expressed by the cost function. Similarly, if the threshold is too high, there may be too many false negative errors.

The calculation of the optimal threshold 200 can be very difficult, especially when the internals of the detection system are hidden from the user. On the other hand, the detection system cannot output a binary positive/negative decision when the priors of the input and the cost function are not known to the designer of the detection system.

SUMMARY OF THE INVENTION

There is provided in accordance with a preferred embodiment of the present invention a method for use in a detection unit that produces a score to be converted into a binary decision via the setting of a threshold. The method is a method for generating the score as an error-derived score such that the threshold is a tolerable one-sided error probability. The method includes the steps of generating a primary score that is a monotonic function of the posterior probability, obtaining a distribution of primary scores of input signals that ought to lead to a particular binary decision, and translating, based on the distribution, the primary score of a current input signal to the error-derived score.

In accordance with a preferred embodiment of the present invention, either the distribution is determined from knowledge of internals of the detection unit or from calibration input signals.

Moreover, in accordance with a preferred embodiment of the present invention, when the tolerable one-sided probability is a false positive error probability and the particular binary decision is a negative decision, the step of translating includes the step of determining the percentage of the input signals whose primary scores are higher than the primary score of the current input signal. Furthermore, in accordance with a preferred embodiment of the present invention, when the tolerable one-sided probability is a false negative error probability and the particular binary decision is a positive decision, the step of translating includes the step of determining the percentage of the input signals whose primary scores are lower than the primary score of the current input signal.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

In many detection systems comprising a detection unit (DU) and an application system (AS), the designer of the AS is willing to tolerate a one-sided error probability, while desiring to minimize the other one-sided error probability.

The present invention uses this fact to provide an error-derived scoring method for a detection unit that directly reflects the one-sided error probability that the designer of the AS is willing to tolerate. The AS can then set a threshold on the error-derived score given by the DU, without having any information on the internals of the DU.

In order to clarify the explanation of the present invention, a particular example will be used. It will be appreciated, however, that the present invention is suitable for any detection system that receives an input signal and has to detect a property of the signal, typically whether the source of the signal is a predefined object. Such systems may include radar systems, speaker recognition systems, medical diagnostic systems, fingerprint identification systems and many more.

In the present example, a detection system in a bank comprises a speaker verification detection unit and an application subsystem. The application subsystem has to decide whether to grant access to some data to speakers, based on a score produced by the detection unit. According to a preferred embodiment of the present invention the bank may tune the detection system so that only one in 200 imposters may be granted access to the data (the one-sided error probability is thus a false positive error probability of 0.5%). in another bank the system threshold might be tuned so that only 1% of the true users will be rejected. This decision is taken so that the bank does not compromise on service quality (a one-sided error probability in which the false negative error probability is 1%), and the rejection of imposters is determined by this policy.

Figure 1:
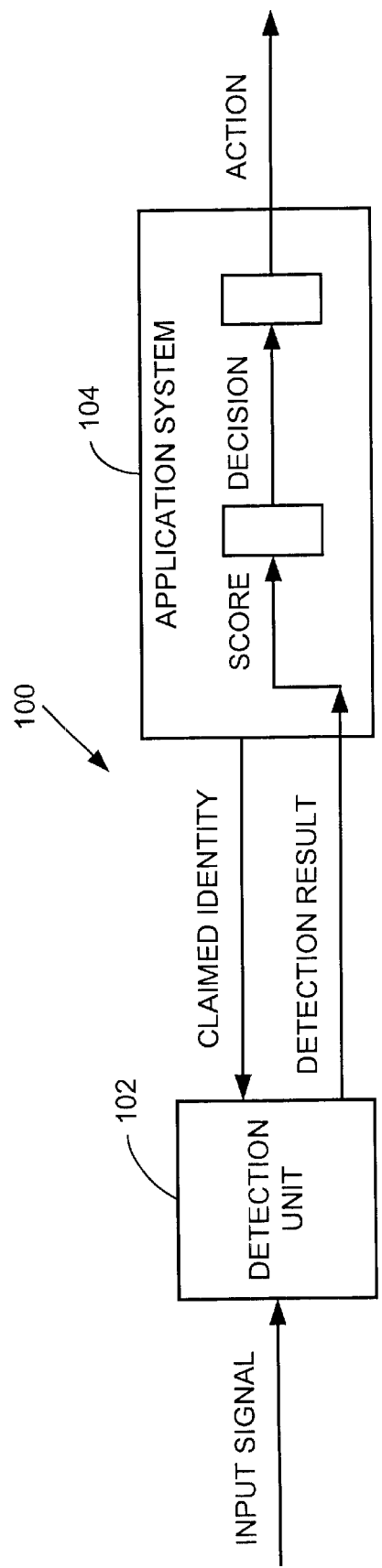
FIG. 1 is a block diagram illustration of a detection system, as is known in the art.
Figure 2:
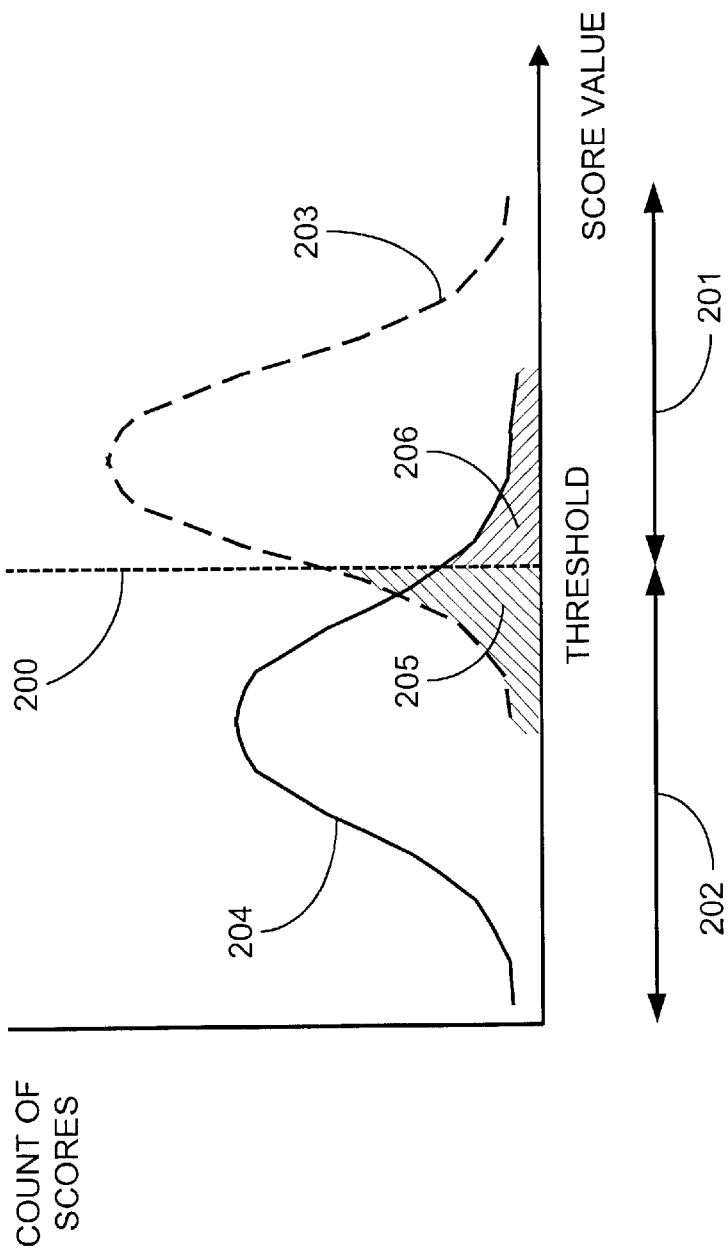
FIG. 2 is an illustration of a graph showing the count of scores as a function of the score value, for a hypothetical detection system, as is known in the art.
Figure 3:
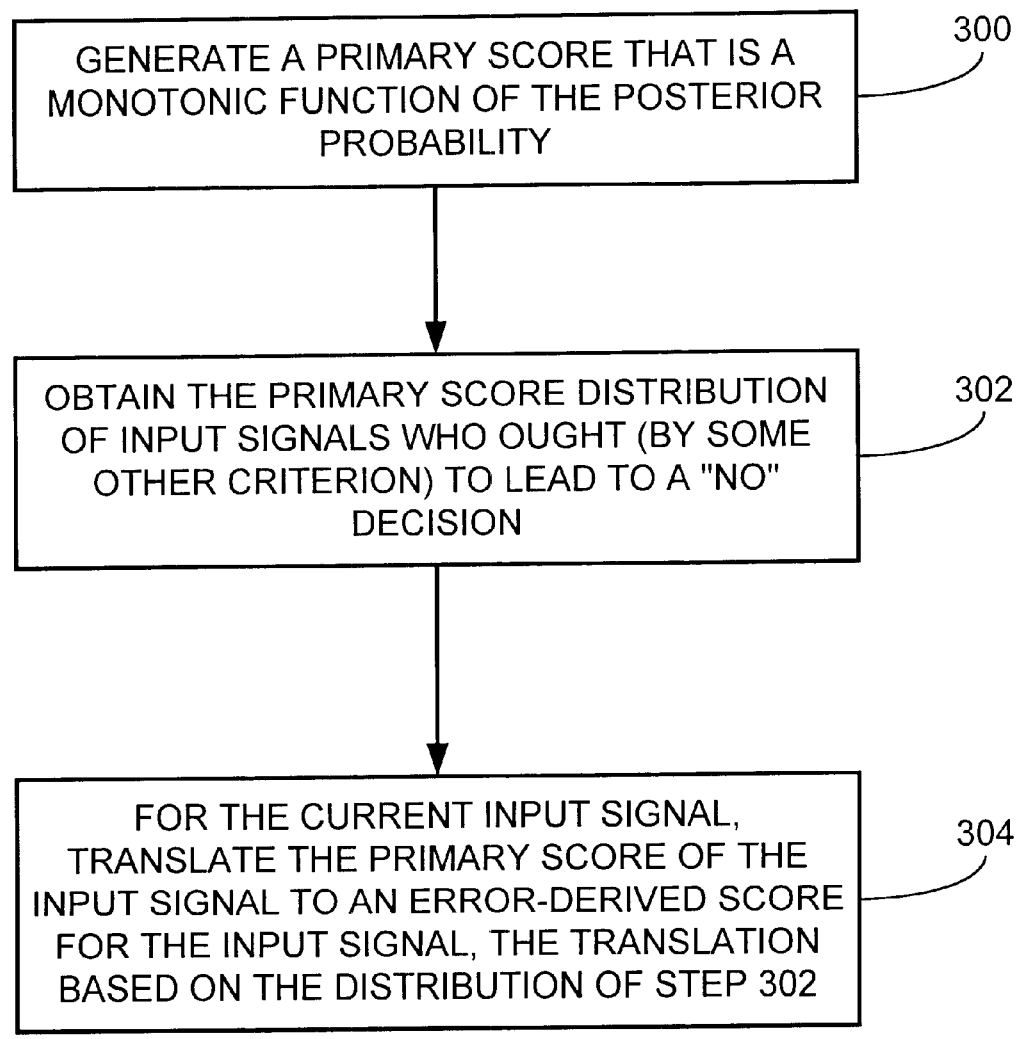
FIG. 3 is a flowchart illustration of an error-derived scoring method, according to a preferred embodiment of the present invention.

Reference is now made to FIG. 3, which is a flowchart illustration of a method for producing an error-derived score, in accordance with a preferred embodiment of the present invention. The detection unit generates a primary score that is a monotonic function of the posterior probability (step 300). The detection unit obtains the primary score distribution of input signals that ought (by some other criterion) to lead to a negative decision (step 302). Then the detection unit translates the primary score for the input signal to an error-derived score for the input signal (step 304). This translation may be done, for example, by counting which percentage of the signals whose distribution was obtained in step 302 had higher primary scores than the primary score of the input signal whose error-derived score is currently being generated.

In the present example, the speaker verification DU may store measurements from many calibration imposters. When a tested speaker is measured, the speaker verification DU does not report to the bank AS the primary score or the posterior probability. Instead it reports which fraction of the calibration imposters has a primary score higher than the primary score of the tested speaker. If this fraction is 10% and the tolerable false positive error probability is 1%, the bank AS must issue a negative decision. Had the AS granted access to this speaker it would have to grant access to the 10% of the imposters that are more similar to the true speaker, resulting in a false positive error probability of 10%.

Figure 4:
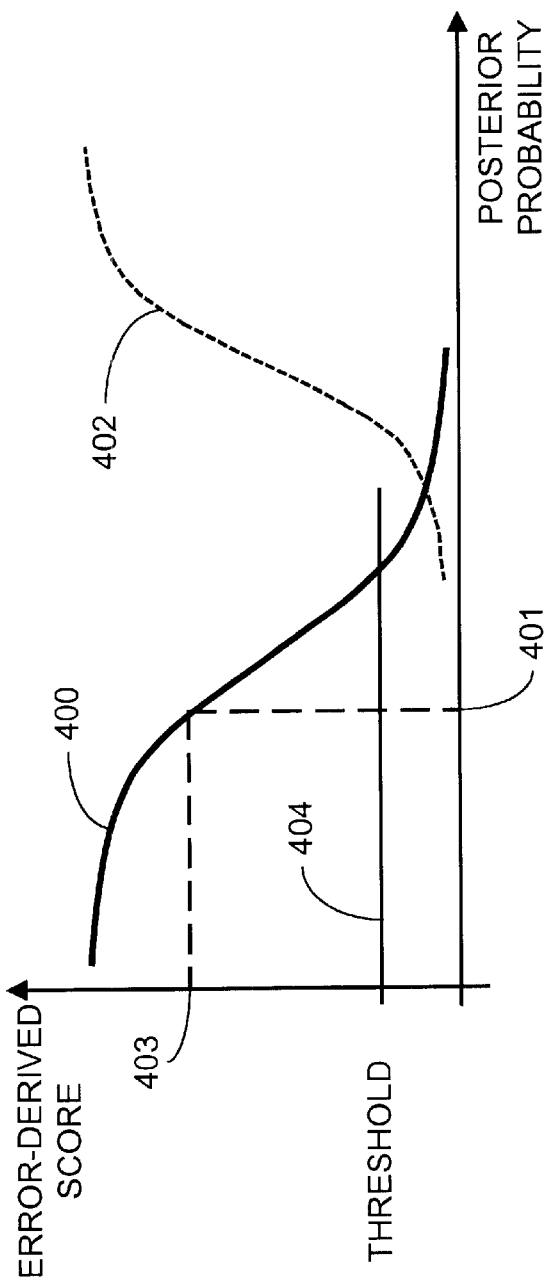
FIG. 4 is an illustration of a graph showing the relationship between the error-derived score of FIG. 3 and a standard score, according to a preferred embodiment of the present invention.

Reference is now made additionally to FIG. 4, which is an illustration of a graph showing the relationship between the error-derived score of FIG. 3 and a standard score, according to a preferred embodiment of the present invention. The standard score, for example the posterior probability, is graphed on the horizontal axis, while the error-derived score is graphed on the vertical axis. The solid bold line 400 indicates the false positive error rate. It represents the calibration curve, used for translating the primary score 401 to the error-derived score 403. For completion, dotted line 402 indicating the false negative error rate is shown as well.

The AS designer sets a threshold 404 at 10%. A positive decision is assigned to all signals generating error-derived scores lower than the threshold 404.

The method described herein above with respect to FIGS. 3 and 4 was for the case where the AS designer is willing to tolerate a false positive error rate. It will be appreciated by persons skilled in the art that a similar method may be used for the case where the AS designer is willing to tolerate a false negative error rate.

It will be appreciated by persons skilled in the art that the present invention is not limited by what has been particularly shown and described herein above. Rather the scope of the invention is defined by the claims that follow:

What is claimed is:

1. in a detection unit that produces a score, a method comprising the steps of:
   generating a primary score that is a monotonic function of a posterior probability;
   obtaining a distribution of primary scores of input signals that ought to lead to a particular binary decision; and
   translating, based on said distribution and a tolerable one-sided error probability, the primary score of a current input signal to an error-derived score.

2. A method according to claim 1, wherein said distribution is determined from knowledge of a particular internal structure of a detection unit.

3. A method according to claim 1, wherein said input signals are calibration signals.

4. A method according to claim 1, wherein, when said tolerable one-sided probability is a false positive error probability and said particular binary decision is a negative decision, said step of translating comprises the step of:

determining the percentage of said input signals whose primary scores are higher than said primary score of said current input signal.

5. A method according to claim 1, wherein, when said tolerable one-sided probability is a false negative error probability and said particular binary decision is a positive decision, said step of translating comprises the step of:

determining the percentage of said input signals whose primary scores are lower than said primary score of said current input signal.

6. A method comprising:

generating from an input signal a primary score that adheres to a monotonic function of a posterior probability that said input signal has a given searched property, said primary score to be converted to a binary decision via setting of a threshold;

obtaining a distribution of primary scores of input signals that ought to lead to a same given binary decision; and translating, based on said distribution and a tolerable one-sided error probability, a primary score of a current input signal to an error-derived score, wherein said threshold is said tolerable one-sided error probability.

7. A method according to claim 6, wherein said input signals are calibration signals.

8. A method according to claim 6, wherein, when said tolerable one-sided error probability is a false positive error probability and said same given binary decision is a negative decision, said translating comprises:

determining the percentage of said input signals whose primary scores are higher than said primary score of said current input signal.

9. A method according to claim 6, wherein, when said tolerable one-sided probability is a false negative error probability and said same given binary decision is a positive decision, said translating comprises:

determining the percentage of said input signals whose primary scores are lower than said primary score of said current input signal.

* * * * *